S. K. NIEMI.
SAW SETTING DEVICE.
APPLICATION FILED JULY 22, 1910.
1,038,186.
Patented Sept. 10, 1912.
2 SHEETS—SHEET 2.
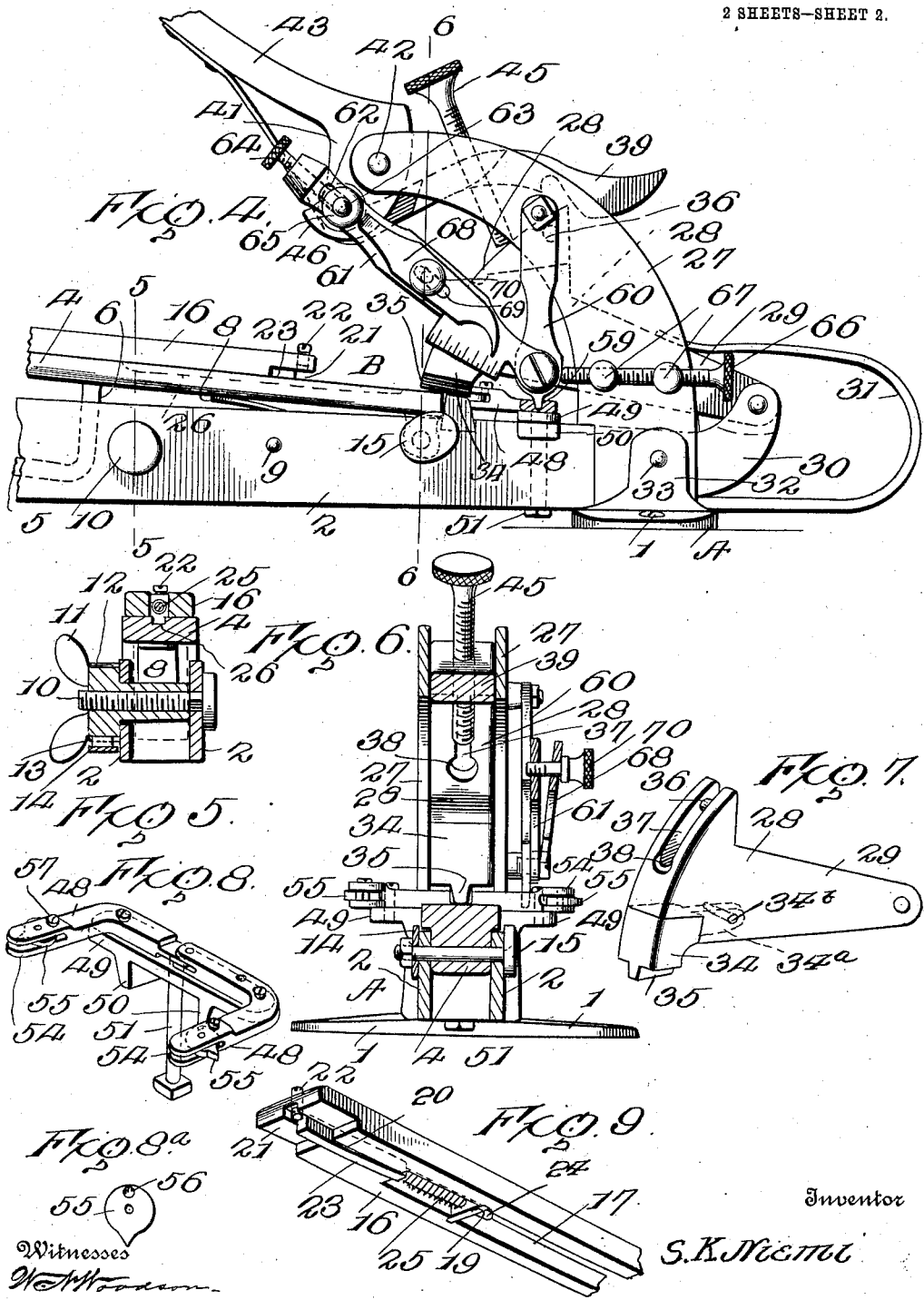

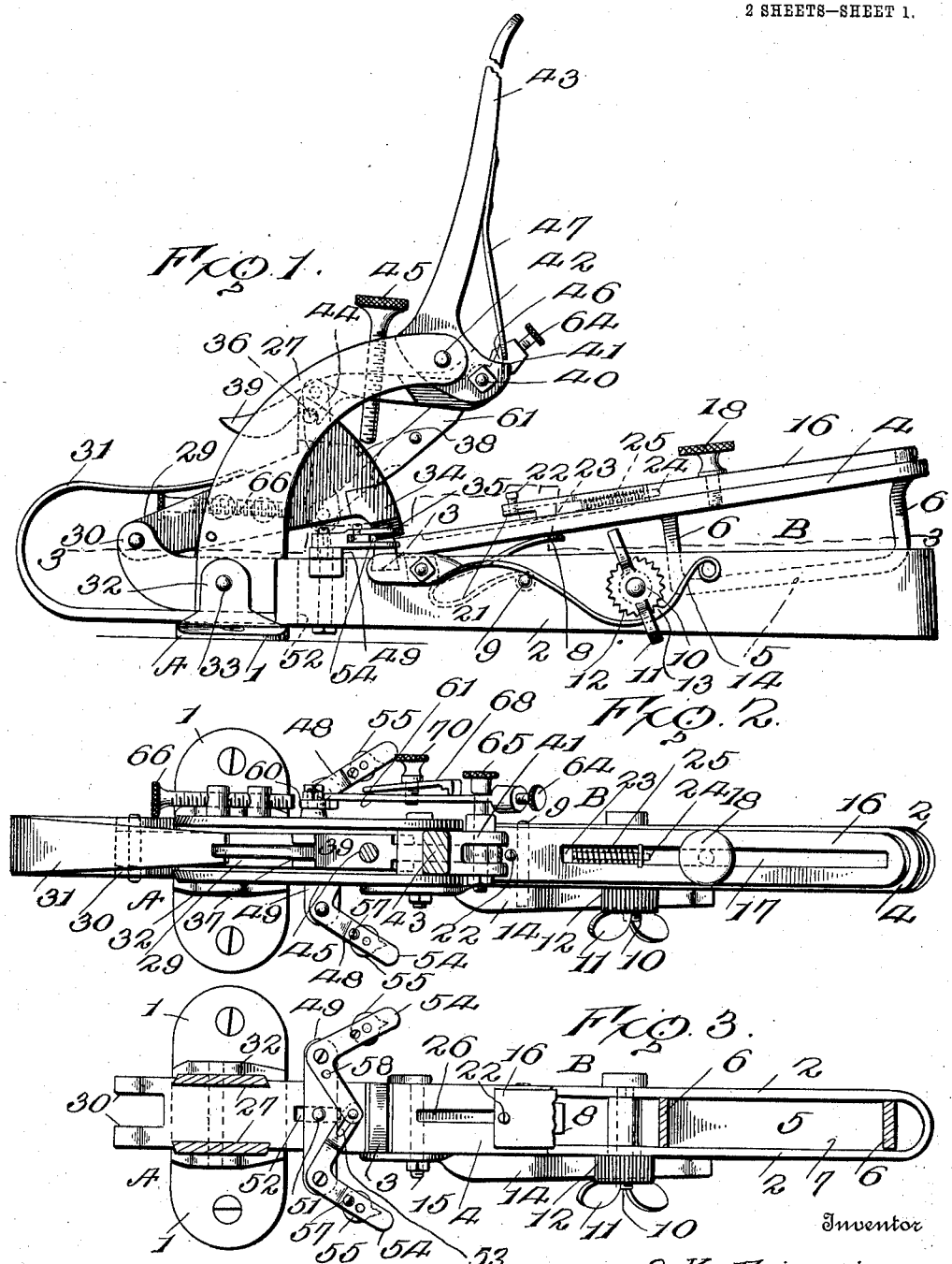

UNITED STATES PATENT OFFICE.

SAKARIAS KÄTKYT NIEMI, OF TOWER, MINNESOTA.

SAW-SETTING DEVICE.

1,038,186. Specification of Letters Patent. Patented Sept. 10, 1912.

Application filed July 22, 1910. Serial No. 573,228.

*To all whom it may concern:*

Be it known that I, SAKARIAS KÄTKYT NIEMI, native of Finland, Europe, residing at Tower, in the county of St. Louis and State of Minnesota, have invented certain new and useful Improvements in Saw-Setting Devices, of which the following is a specification.

This invention comprehends certain new and useful improvements in apparatus for use in setting saw teeth, and the invention has for one of its objects a simple, durable and efficient construction of device of this character which is capable of operating upon a very wide range of saws of different sizes.

The invention also has for its object an improved saw setting device embodying means whereby a hammer blow may be easily imposed upon the teeth of the saw, and means whereby this blow may be regulated.

The invention has for its further object an improved saw setting device embodying improved means whereby the hammer may be raised against the tension of its actuating spring and automatically released at a predetermined point, capable of variation, whereby to vary the blow, as desired.
A further object of the invention is an improved saw setting device embodying improved means whereby the saw will be fed across the anvil and whereby the alternate teeth will be moved accurately to position upon the anvil to be operated upon by the hammer, the movement being automatically taken care of by the apparatus after the parts have been properly adjusted.

The invention also has for its object, in a device of this type, an adjustable saw guide arranged to co-act with the feeding mechanism to hold the saw with its teeth properly on the anvil and in proper relation to the feeding device.
The invention has for a further object an improved feeding device in a saw setting tool, capable of adjustment whereby the saw may be fed in either direction across the anvil.
The invention has for a further object a saw setting tool including a bed or saw rest which is capable of adjustment to different inclinations, whereby a greater or less inclination may be given the blade as it rests on the bed, according to the particular degree to which it is desired or required the teeth shall be set, this being manifestly governed ordinarily by the character of saw and the precise use for which the saw is to be put. Preferably, the bed or saw rest embodies a gage whereby it may be properly set for the ordinary saws according as the same are desired for use with different kind of timber, such as hard wood, pine wood and soft wood, such as cedar.

The invention also has for its object means whereby not only the stroke or blow of the hammer may be regulated, but the feeding devices regulated correspondingly so that if desired the blow of the hammer may bear a definite relation or proportion to the intermittent movement of the saw across the anvil of the apparatus. And the invention has for a still further object to generally improve this class of devices and to make them commercially more desirable, more durable and more efficient.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a side elevation of a saw setting tool constructed in accordance with my invention; Fig. 2 is a top plan view thereof; Fig. 3 is a horizontal sectional view of the device, the section being taken on the line 3—3 of Fig. 1; Fig. 4 is an enlarged side elevation of a portion of the tool, looking from the side opposite to that shown in Fig. 1; Fig. 5 is a detail sectional view on the line 5—5 of Fig. 4; Fig. 6 is a transverse sectional view on the line 6—6 of Fig. 4; Fig. 7 is a detail perspective view of the hammer; Fig. 8 is a similar view of the saw feeding arms; Fig. 8[a] is a perspective view of one of the disks carried by said arms; and, Fig. 9 is a fragmentary perspective view of the guide bar for the saw.

Corresponding and like parts are referred to in the following description and indicated in all the views of the drawings by the same reference characters.

My improved saw setting device may embody a base so that it may be secured to any desired support, said base in the present instance embodying two laterally extending ears 1 that are formed with holes to receive screws or similar fastening devices. Connected to the base is an elongated or attenuated frame which embodies side members 2 preferably of bar steel arranged in parallel relation to each other and connected at one end by a curved cross bar and at their other end by a preferably solid portion, on the upper face of which is secured an anvil 3. The base is designated A and the frame B.

Supported upon the frame B and adapted to rest in one position upon the upper edges of the side members 2 thereof is a saw rest or table 4, the same being pivotally connected at one end to the frame contiguous to the anvil 3 and extending longitudinally of the frame and preferably of the same width thereof. The table or saw rest 4 is formed with a depending bracket 5 which includes two substantially perpendicular members 6 connected at their lower ends by a longitudinal bar 7, said bracket being designed to fit between the side members 2 and properly guide the table 4 in its pivotal movement, but resisting any sidewise strain. A spring 8 is secured between the side members 2 of the frame B, one end of said spring being secured to a cross pin 9, while the other free end of the spring bears upwardly upon and engages the lower face of the table 4, said spring exerting an upward tension on the table. To secure the table 4 rigidly in position after it has been adjusted to the desired inclination, I provide a clamping bolt 10 which extends transversely through the side member 2 of the frame B, a wing nut 11 working on one end of said bolt and designed to clamp the side members 2 firmly against the guide bracket 5, the frictional engagement thereby produced resisting the action of the spring 8 and securely holding the table 4 at the required inclination relative to the frame. In order to prevent the jar to which the device is, of course, subjected in use, from loosening the nut 11 and thereby unintentionally changing the adjustment of the parts, the nut 11 is formed with a milled or serrated head 12 designed for engagement by a locking tooth 13 which is formed on a spring detent 14. This detent is secured at one end to the same bolt 15 which serves as the pivot stud for the table 4 and passes over the same pin 9 to which the spring 8 is secured, the said detent being thereby held under proper tension with its tooth 13 in engagement with the milled head 12 of the winged nut. The table 4 supports a guide bar 16 which is preferably substantially the same width as the table upon the upper surface of which it rests and it is arranged for a longitudinal sliding movement on the table. To permit said movement and at the same time provide for the proper fastening of the guide bar to the table after the desired adjustment has been effected, the said bar is formed with a longitudinal slot 17, and a set screw 18 works through said slot and into a threaded opening formed for it in the table. The slot 17 is intersected by a transversely extending web 19, and the guide bar 16 is formed on its lower face with a longitudinal recess 20 communicating at one end with the slot and at its other end with a transversely extending recess 21 which is contiguous to the anvil 3. The longitudinal recess 20 is continuous from the slot 17 to that end of the guide bar 16 which is next to the anvil, and a guide screw 22 works in such end of the guide bar and is adapted to be protruded from the end of the longitudinal recess into the transverse recess, as desired, in order to engage the upper face of the saw being passed across the anvil and hold it properly down upon the bed and anvil. The guiding of the saw is also assisted by means of a spring pressed guide pin 23 which is mounted for a longitudinal movement in the recess 20 and which is provided with a rounded stem 24 working through the web 19, an expansion spring 25 being coiled around said stem and bearing against said web. The function of the guide pin 23 is to engage the rear or smooth edge of the saw blade so as to hold the tooth edge thereof properly over the anvil 3 and into engagement with either one or the other of two feeding devices which will be presently described.

It is to be particularly noted that the upper face of the table 4 is formed with a longitudinal groove 26 and that the pin 23 works in said groove, as well as in the recess 20. By this means, it is clear that a single set screw, as 18, is sufficient to hold the guide bar 16 secure on the table 4, any lateral movement of the guide bar being prevented by the guide pin 23 and its engagement with the side walls of the groove 26.

Rising from the base A are two preferably curved laterally spaced standards 27 between which a hammer 28 is mounted. The hammer is provided with a shank 29 which is pivotally mounted between ears 30 forming part of the main supporting frame of the device and the upper end of the shank 29 is engaged and the hammer thereby pressed downwardly, by means of the free end of a relatively heavy bowed spring 31, the other end of said spring being securely held between the base A and the lower end of the standards 27. In the present embodiment of the invention, the standards are mounted at their lower ends between lugs 32 which project upwardly from the base, a bolt 33 being passed laterally through the lugs and through the standards securing the same in place, while at the same time the lugs and standards assist in fastening the bowed spring 31. The head 34 of the hammer is preferably a separate block provided with the ordinary tooth setting lip or die 35 and is secured to the body portion of the hammer in any desired way, but preferably in a detachable manner so that one head may be detached and another substituted therefor, particularly when operating upon specially large saws. As one means for effecting this detachable connection the hammer head is formed with a reduced shank 34ª which fits snugly in a suitable socket provided therefor in proximity to the lower edge of the hammer, a pin 34ᵇ being inserted in transversely registering apertures in the hammer and the shank for the purpose of retaining the shank in the socket. (See Fig. 7.) The hammer head illustrated is suitable for setting saws ranging in size from an ordinary two-man cross-cut saw down to a hack saw of twenty teeth to the inch, and in setting saws beyond this range, a larger head may be used, merely by pushing out the pin 34ᵇ to release the hammer head and substituting one of a different size, thereby rendering the apparatus capable for use in setting large circular saws up to any diameter, it being, of course, understood that some of the other parts will have to be removed and replaced, or at least adjusted for this purpose.

In order to raise the hammer and automatically release it at the proper time according to the blow which it is desired the hammer shall impose on the tooth over the anvil 3, I have in the present embodiment of the invention provided the following instrumentality: The hammer is provided on its upper edge with a clevis in the form of a pin 36 secured to the body portion of the hammer and extends across the upper rear end of a recess 37 which extends longitudinally of the hammer and terminates at its forward lower end in a socket 38. A trigger 39 is pivotally mounted, as at 40, in the forked arm 41 of a bell crank operating lever which is fulcrumed at 42 between the upper ends of the standards 27 and which embodies an upwardly extending handle arm 43. The trigger 39 extends forwardly between the standards and is formed in its lower edge with a hook 44 designed to engage the pin 36 whereby a rearward and downward pressure on the handle 43 will swing the trigger 39 upwardly and thereby raise the hammer against the tension of its spring 31. The trigger carries a trip or releasing rod 45 which is in the form of a screw working therethrough whereby the position of the rod may be adjusted, and the lower end of said rod is adapted to work in the recess 37 and at the proper time to engage the bottom wall of the socket 38 of the hammer, whereby the continued downward and rearward movement of the handle 43 will cause the trigger to be released from the hammer, the hammer being thereby permitted to descend forcibly through the influence of its spring, upon the tooth resting over the anvil 3 so as to set said tooth. The trigger 39 is formed above its pivot with an upwardly projecting lug 46 which is pressed upon by the free end of a leaf spring 47 secured to the rear side of the handle 43, the trigger being thereby yieldingly mounted and being at all times maintained in proper position for engagement with the pin 36. By regulating the releasing rod 45, that is, by raising or lowering the same, it is obvious that the releasing operation may take place later or sooner as desired and consequently the hammer may be raised to a greater or less degree and the blow thereof correspondingly varied.

In order to automatically feed the saw across the anvil, I have provided a feeding device, above mentioned, as co-acting with the guide pin 23, said feeding device in the present instance embodying two bell crank or L-shaped arms 48 fulcrumed at their elbows on vertically extending pins or studs secured to the ends of a laterally extending longitudinally movable slide 49. The slide 49 is formed with depending guide lugs 50 embracing the outer faces of the side members 2 of the frame B and is mounted for a longitudinal movement on the frame, as noted, this movement being limited by a pin 51 carried by the slide and extending down into a longitudinal slot 52 formed in the solid portion of the frame. The slide is prevented from accidental detachment from the frame by means of a nut screwing on the lower end of the pin 51, as clearly illustrated in the drawing. The feeding arms 48 have one member extending inwardly, as shown, the said inwardly extending members being connected together for a simultaneous movement by a slot and pin connection 53 and the other members of said arm projecting rearwardly and in preferably rearwardly diverging relation to each other, on opposite sides of the anvil 3. Each of these last named members is forked, as indicated at 54, the slots between the forked members being horizontally disposed, as shown, and at the bases or bottoms of the forks toothed disks 55 are mounted for a rotatable movement. Each of these disks is formed with one or more teeth designed for engagement with the teeth of the saw and each disk is further formed with a socket 56 designed to receive a set screw 57, whereby either disk may be held relatively stationary with its tooth projecting into an operative position, the releasing of the set screw permitting the disk to roll. The inwardly extending member of one feed arm 48 is formed with a socket 58 in which a pin or nib 59 is seated. This nib is formed on the lower end of a crank arm 60 which is pivotally connected at its upper end to one of the standards 27. The crank arm 60 is connected near its lower end to the arm 41 of the actuating lever, whereby the arm of the lever will be connected to the crank arm so as to swing the feeding arms 48 laterally and cause either one or the other of the toothed disks to engage the tooth edge of the saw blade being operated upon and feed the saw blade over the anvil in a lateral direction. In the present embodiment of the device, the connection between the arm 41 of the actuating lever and the crank arm 60 is a pitman 61 which is pivotally mounted at one end on a wrist pin carried by the crank arm 60 and is slotted, as at 62, at its opposite end so that it may be slipped over a pin 63 extending laterally from the arm 41 to the actuating lever. By means of set screws 64 and 65 the connection between the arm 41 and crank arm 60 may be lengthened or shortened, as required so as to vary the throw of the feeding arms 48 independently of or proportionate to the throw of the hammer 28, and the movement of the feeding arms would also be governed, that is, limited by a stop screw 66, working through slotted pins 67 projecting laterally from one of the standards 27, one end of said stop screw being designed for an abutment against which one edge of the crank arm will strike when the crank arm is moved in one direction. The pitman 61 is formed with a scale, as shown, designed to co-act with the pointer which is formed by the curved and pointed end of a regulating bar 68, as best illustrated in Fig. 4, to show the side of the saw being set. The bar 68 is formed with a slot 69 to accommodate a set screw 70 screwing into the pitman 61, whereby the position of the bar 68 on the pitman may be varied. The upper rear end of the bar 68 is adapted to abut against the set screw 65 to assist in holding the same in properly adjusted position, and as the particular position of the set screws 64 and 65 in the slot 62 of the pitman 61 determines the stroke, that is, the length of stroke, of the saw feeding devices upon each actuation, a predetermined adjustment may be easily effected by placing the pointer end of the bar 68 at the proper graduation of the scale, then locking said bar in its adjusted position, and then bringing the set screw 65 down in the slot 62 into engagement with the rear upper end of the bar 68 and locking it in this position by the set screw 64.

From the foregoing description in connection with the accompanying drawings, the operation of my improved saw setting device will be apparent. After the guide bar 16 has been properly set on the bed or table 4 according to the width of the saw blade being operated upon and the table 4 which is adjusted to the required inclination according to the set it is desired the tooth shall have, the releasing rod 45 is adjusted according to the desired stroke or blow of the hammer and the saw shifting or feeding devices are accordingly adjusted to feed the distance of two teeth every time the hammer is raised. The direction in which the saw shall be fed is determined by the tooth disks 55, one of them being permitted to turn free while the other is held with its tooth projecting into engagement with the tooth edge of the saw, and the saw blade is fed across the anvil through or between the forks 54 which project beyond the disks. As the actuating handle is depressed to raise the hammer preparatory to the automatic release thereof and the subsequent blow which the hammer will impose on the saw tooth resting on the anvil, the crank arm 60 will be swung in a direction to cause the diverging members of the feeding arms to swing inwardly toward each other, and manifestly the saw will be shifted laterally in one direction or the other according to which of the two disks is held in an operative position. Preferably one of the perpendicularly extending arms 6 of the bracket 5 is provided with indicating characters, such as H, P and S, the same being designed for registry with the upper edge of the adjoining side member 2 of the frame B to indicate the proper inclination of the table 4 for setting the teeth of a saw for use with hard wood, pine wood, or soft wood, respectively. As the feeding arms 48 are mounted upon the slide 49, it is obvious that in the movement of the crank arm 60 to actuate the feeding arm, the diverging members of said arms will first be moved inwardly toward each other so as to cause the operative tooth disk to shift the saw laterally while the slide 49 will permit the toothed disk to properly release itself from the saw tooth and move into readiness for engagement with a succeeding tooth without a liability of the parts to hang. It will be understood that as the hammer is raised from the anvil the crank arm 60 will first move the feeding arms 48 in a direction to swing their forked ends toward each other, such movement being entirely independent of any movement of the slide 49 and resulting in the lateral shifting movement of the saw by the engagement of a disk 55 with the teeth of the saw. The continued movement of the crank arm 6 in the same direction, will finally cause the movement imparted to the feeding arms to be transmitted thereby to the slide 49 and the latter will be shifted so as to carry the arms 48 out of operative relation to the toothed edge of the saw and thereby release the operative disk from the saw teeth. In the reverse movement, the feeding arms will first be swung outwardly independently of any movement of the slide 49 and the slide 49 will finally be brought back to its initial position where the operative disk will be in readiness to again engage the toothed edge of the blade. The foregoing operation is repeated until all the alternate teeth of the saw have been set at the desired angle on one side of the saw blade. The saw is then removed and reversed end for end and again applied to the setting device. By properly manipulating the disks 55 the saw will be fed across the anvil in the reverse direction and the remaining teeth set at an angle to the opposite face of the saw blade.

It is, of course, to be understood that my invention is not limited to the precise construction, arrangement and proportions of the parts herein shown and described, but that various changes may be made without departing from the scope of the invention as defined by the appended claims.

Having thus described the invention, what is claimed as new is:

1. In a saw setting device, an anvil, a feeding arm for moving a saw across the anvil, a slide on which the feeding arm is movably mounted, said slide being movable toward and away from the anvil, and means for both moving the feeding arm relative to the slide and moving the slide relative to the anvil.

2. In a saw setting device, an anvil, a feeding arm for moving a saw across the anvil, a support on which the feeding arm is movably mounted, means for permitting the support to move bodily toward and away from the anvil, and means for moving the feeding arm relative to the support and then moving the support relative to the anvil.

3. In a saw setting device, a pivoted feeding arm adapted to engage a saw and movable about its pivot to feed the saw across, means for permitting the feeding arm to move bodily into and out of engagement with the saw, and means for alternately moving the arm about its pivot and moving the arm bodily with respect to the saw.

4. In a saw setting device, an anvil, a saw table supported in juxtaposition thereto, a longitudinally adjustable guide bar mounted upon the table, a set screw connecting the guide bar to the saw table, and a guide pin having guided longitudinal movement relative to both the guide bar and the saw blade, whereby to hold the guide bar against turning movement about the set screw as a pivot, the guide pin being spring-pressed toward the end of the guide bar next to the anvil to bear against an edge of the saw.

5. In a saw setting tool, the combination of an anvil, a spring pressed hammer coacting therewith, a trigger designed to engage said hammer to raise the same against the tension of its spring, a handle operatively connected to said trigger, and a releasing rod carried by the trigger and arranged to engage the hammer to release the trigger therefrom at a predetermined point in the movement of the trigger.

6. In a saw setting tool, the combination of an anvil, a spring pressed hammer coacting therewith, a trigger designed to engage said hammer to raise the same against the tension of its spring, a handle operatively connected to said trigger, and a releasing rod adjustably carried by the trigger and arranged to engage the hammer to release the trigger therefrom at a predetermined point in the movement of the latter.

7. In a saw setting tool, the combination of an anvil, a spring pressed hammer coacting therewith and provided in its upper edge with a clevis, a trigger formed with a hook designed to engage said clevis whereby the upward movement of the trigger will raise the hammer, means for operating said trigger, and a releasing rod carried by the trigger and adapted to engage the hammer at a predetermined point in the movement thereof, whereby to disengage the hook of the lever from said clevis.

8. In a saw setting device, an anvil, a hammer co-acting therewith and provided with a recess, a trigger designed to engage the hammer to move the same away from the anvil, means for operating the trigger, and a trip device carried by the trigger and guided between the side walls of the recess and adapted to abut against the bottom wall of said recess to release the trigger from the hammer.

9. In a saw setting tool, the combination of an anvil, a frame supporting the same and embodying spaced side members, a saw table pivotally connected to the frame and arranged in juxtaposition to the anvil, the table being provided with a depending bracket fitting between said side members, and a clamping bolt extending through said side members and adapted to clamp the same together against the bracket so as to rigidly hold the table at different inclinations.

10. In a saw setting tool, the combination of an anvil, a supporting frame embodying spaced side members, a saw table pivotally connected at one end to the frame in juxtaposition to the anvil, a spring secured between said side members and bearing upwardly against the table, a bracket secured to and depending from the table and fitting between said side members, and a tension bolt extending through said side members and adapted to clamp the same together against the sides of the bracket, whereby to hold the table rigidly at different inclinations against the tension of the spring.

11. In a saw setting tool, the combination of an anvil, a saw table supported in juxtaposition thereto, a guide bar carried by said table and formed at its end next to the anvil with a transversely extending recess, a set screw working in said end of the guide bar and adapted to protrude into the recess to engage the upper face of a saw blade passed across the anvil, and a spring pressed pin also adapted to protrude into the recess and movable in a direction at right angles to the screw and designed to engage the edge of the blade.

12. In a saw setting tool, the combination of an anvil, a saw table arranged in juxtaposition thereto, a guide bar guided by the saw table, the table being formed in its upper face with a longitudinal groove, the guide bar being formed in its lower face with a corresponding recess, and a spring pressed guide pin movable in said groove and recess, for the purpose specified.

13. In a saw setting tool, the combination of an anvil, a slide supported in proximity thereto, an arm pivotally mounted on said slide and provided with means for engaging the toothed edge of a saw blade laid on the anvil, a crank arm connected to said first-named arm, and means for moving said crank arm whereby to rock the same on the slide and subsequently move the latter, for the purpose specified.

14. In a saw setting tool, the combination of an anvil, a slide supported in proximity thereto, angular arms pivotally mounted on said slide, said arms having a slot and pin connection with each other at one end and provided at their other ends with means for engaging the toothed edge of a saw laid on the anvil, a crank arm movable in a plane corresponding to the movement of the slide and engaging one of said arms, for the purpose specified, and means for actuating said crank arm.

15. In a saw setting device, a slide movable toward and away from the toothed edge of the saw, a pair of feeding arms pivoted independently to the slide, the arms being operatively connected together at one end and being provided at their other ends with means for engaging the toothed edge of the saw, and actuating means acting on one of the arms and operating in the direction of movement of the slide, to simultaneously turn the arms in reverse directions and subsequently move the slide.

In testimony whereof, I affix my signature in presence of two witnesses.

SAKARIAS KÄTKYT NIEMI. [L. S.]

Witnesses:
JOHN ERICKSON,
JOHN C. LEWIS.